(12) United States Patent  (10) Patent No.: US 8,191,664 B2
Steller  (45) Date of Patent: Jun. 5, 2012

(54) FRONT SECTION FOR A MOTOR VEHICLE

(75) Inventor: Claus Steller, Gross-Gerau (DE)

(73) Assignee: GM Global Technology Operations LLC, Detroit, MI (US)

( * ) Notice: Subject to any disclaimer, the term of this patent is extended or adjusted under 35 U.S.C. 154(b) by 388 days.

(21) Appl. No.: 12/295,589

(22) PCT Filed: Mar. 28, 2007

(86) PCT No.: PCT/EP2007/002752
§ 371 (c)(1),
(2), (4) Date: Jan. 12, 2009

(87) PCT Pub. No.: WO2007/115689
PCT Pub. Date: Oct. 18, 2007

(65) Prior Publication Data
US 2009/0184526 A1  Jul. 23, 2009

(30) Foreign Application Priority Data

Apr. 6, 2006 (DE) .......................... 10 2006 016 159

(51) Int. Cl.
*B60K 11/04* (2006.01)
(52) U.S. Cl. ...................................... 180/68.4; 180/68.6
(58) Field of Classification Search ................. 180/68.4, 180/68.6; 293/115
See application file for complete search history.

(56) References Cited

U.S. PATENT DOCUMENTS

| | | | |
|---|---|---|---|
| 4,541,645 A | | 9/1985 | Foeldesi |
| 5,326,133 A * | | 7/1994 | Breed et al. .................... 280/735 |
| 6,260,609 B1 * | | 7/2001 | Takahashi ....................... 165/69 |
| 6,364,403 B1 | | 4/2002 | Ozawa et al. |
| 6,412,581 B2 * | | 7/2002 | Enomoto et al. ............. 180/68.4 |
| 6,758,515 B2 * | | 7/2004 | Ozawa et al. ............ 296/187.09 |
| 7,013,951 B2 * | | 3/2006 | Bauer et al. ...................... 165/41 |
| 7,044,246 B2 * | | 5/2006 | Fujieda ........................ 180/68.4 |
| 7,090,265 B2 * | | 8/2006 | Otte ............................... 293/115 |
| 7,114,587 B2 * | | 10/2006 | Mori et al. .................... 180/68.3 |
| 7,150,335 B2 * | | 12/2006 | Sasano et al. ................ 180/68.4 |
| 7,410,018 B2 * | | 8/2008 | Satou ............................ 180/68.4 |
| 7,628,237 B2 * | | 12/2009 | Marqueling et al. ......... 180/68.4 |

(Continued)

FOREIGN PATENT DOCUMENTS

DE  3246583 C1  4/1984

(Continued)

OTHER PUBLICATIONS

China Patent Office, Chinese Office Action for Application No. 200780010728.0, dated Jul. 19, 2011.

(Continued)

*Primary Examiner* — Jeffrey J Restifo
(74) *Attorney, Agent, or Firm* — Ingrassia Fisher & Lorenz, P.C.

(57) ABSTRACT

A front section for a motor vehicle is provided that includes, but is not limited to a bumper and a radiator module arranged behind the bumper. The radiator module is held by means of first and separable second holding means. The first holding means allow a movement of the radiator module with one degree of freedom in a direction facing away from the bumper when the second holding means are separated, and wherein the second holding means can be separated by a rearward yielding motion of the bumper.

15 Claims, 2 Drawing Sheets

U.S. PATENT DOCUMENTS

| | | | |
|---|---|---|---|
| 7,726,428 B2* | 6/2010 | Kowalski | 180/68.6 |
| 7,766,112 B2* | 8/2010 | Kapadia et al. | 180/68.4 |
| 7,861,988 B2* | 1/2011 | Hamida et al. | 248/232 |
| 2001/0001994 A1* | 5/2001 | Enomoto et al. | 180/68.4 |
| 2002/0129981 A1* | 9/2002 | Satou | 180/68.6 |
| 2007/0080009 A1* | 4/2007 | Kowalski | 180/68.6 |
| 2009/0085373 A1* | 4/2009 | Terada et al. | 296/187.09 |
| 2009/0184526 A1* | 7/2009 | Steller | 293/115 |
| 2009/0266633 A1* | 10/2009 | Obayashi et al. | 180/68.4 |
| 2009/0266634 A1* | 10/2009 | Obayashi et al. | 180/68.4 |
| 2010/0078149 A1* | 4/2010 | Yoshimitsu et al. | 165/67 |
| 2010/0314426 A1* | 12/2010 | Yokoi et al. | 224/555 |
| 2010/0320020 A1* | 12/2010 | Hwang | 180/68.4 |

FOREIGN PATENT DOCUMENTS

| | | |
|---|---|---|
| DE | 19827451 A1 | 1/1999 |
| DE | 10008638 A1 | 9/2000 |
| DE | 10051567 A1 | 4/2001 |
| DE | 10150643 A1 | 4/2003 |
| EP | 1209069 A1 | 5/2002 |
| EP | 1232931 A1 | 8/2002 |
| FR | 2774058 A1 | 7/1999 |
| FR | 2952330 A1 | 5/2011 |
| JP | 2002274430 A | 9/2002 |
| JP | 2002286392 A | 10/2002 |
| WO | 03/070503 A1 | 8/2003 |

OTHER PUBLICATIONS

International Searching Authority, International Search Report for Application No. PCT/EP2007/002752, dated Jul. 19, 2007.

* cited by examiner

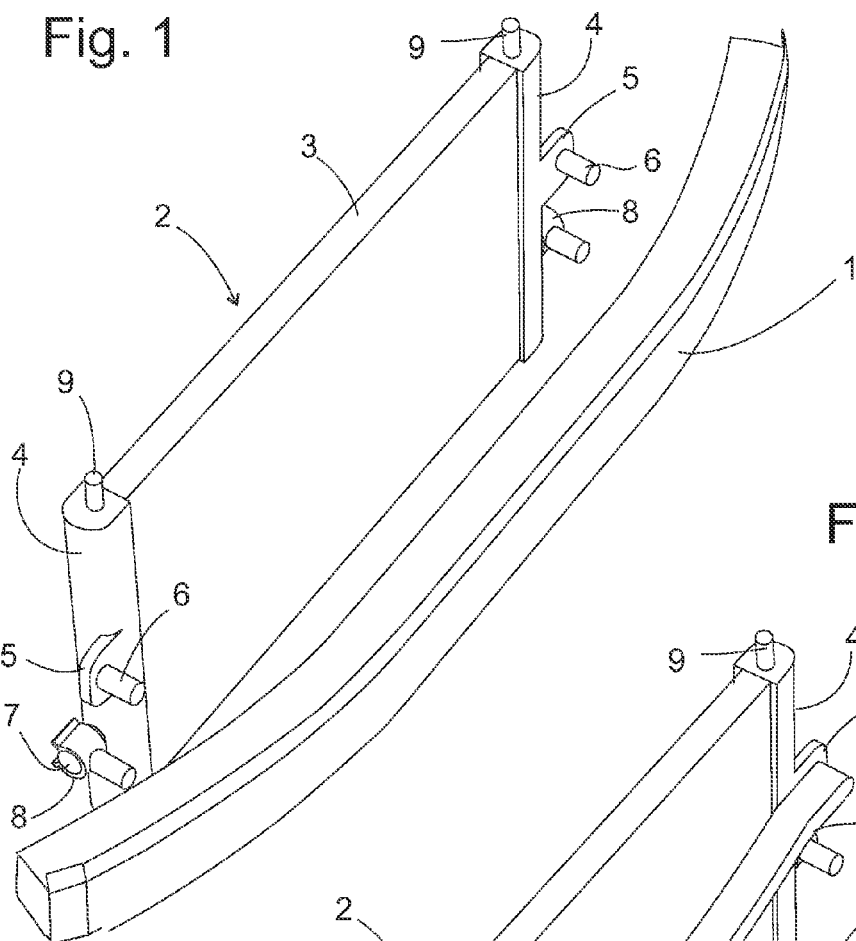
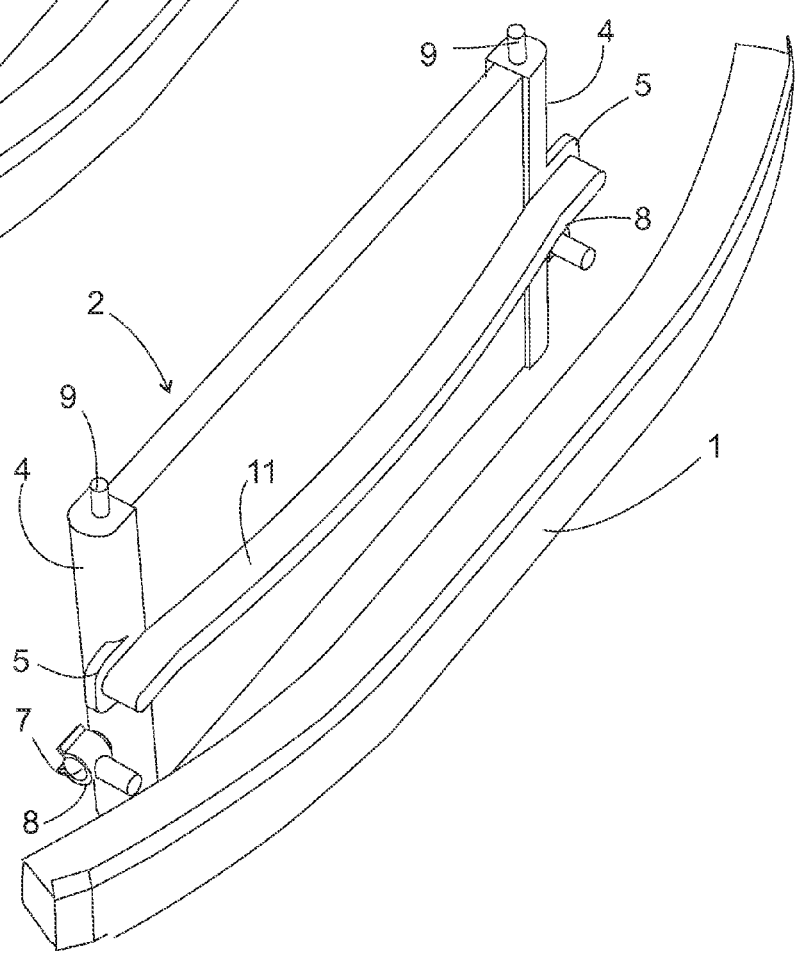

FRONT SECTION FOR A MOTOR VEHICLE

CROSS-REFERENCE TO RELATED APPLICATIONS

This application is a U.S. National-Stage entry under 35 U.S.C. §371 based on International Application No. PCT/EP2007/002752, filed Mar. 28, 2007, which was published under PCT Article 21(2) and which claims priority to German Application No. 102006016159.9, filed Apr. 6, 2006, which are all hereby incorporated in their entirety by reference.

TECHNICAL FIELD

The technical field relates to a front section for a motor vehicle with a bumper and a radiator module arranged behind the bumper.

BACKGROUND

The bumper of such a front section is provided in order to deform in a plastic fashion during a collision with an obstacle or with another vehicle and to purposefully absorb kinetic energy during this process. If the extent of the deformation is greater than an air gap that usually exists between the bumper and the radiator module, the bumper and the radiator come in contact with one another and the radiator is also deformed such that a costly repair or replacement thereof is required. The structure of the radiator mainly has thin sheets with little load-bearing capacity, the deformation of which hardly contributes to the desired absorption of kinetic energy. A minor collision, however, may already cause these thin sheets to deform to such a degree that the radiator is rendered inoperative. If this occurs, the vehicle can no longer be driven and needs to be towed, namely even if the accident otherwise result in body-work damage only.

In view of the foregoing, at least one objective exists for developing a front section for a motor vehicle that can be repaired with low expenditures after a collision and reduces the risk of having to tow the vehicle due to damages to the radiator only. In addition, other objectives, desirable features, and characteristics will become apparent from the subsequent summary and detailed description, and the appended claims, taken in conjunction with the accompanying drawings and this background.

SUMMARY

According to an embodiment of the invention, this at least one objective, and other objectives, desirable features, and characteristics, is attained in that the radiator module in a motor vehicle front section with a bumper and a radiator module arranged behind the bumper is held by first and separable second holding means. The first holding means allow a movement of the radiator module with one degree of freedom in a direction facing away from the bumper when the second holding means are separated, and in that the second holding means can be separated by the rearward yielding motion of the bumper. This construction enables the radiator module to evade the bumper during a rearward yielding motion thereof, namely without having to overcome a noteworthy resistance that could lead to mutual damages of the bumper and the radiator module.

The front section can be realized in a particularly simple fashion if the degree of freedom concerns a pivoting motion. In this case, the first holding means themselves are able, in particular, to define a pivoting axis for the evasive motion of the radiator module.

The radiator module and the bumper should be separated by a gap such that not all rearward yielding motions of the bumper necessarily affect the radiator module.

The second holding means that can be separated by the rearward yielding motion of the bumper may have, in particular, a clamp that is open in the longitudinal direction of the vehicle and a projection inserted into the open side of the clamp. In this case, the projection may be solidly connected to the radiator module and the clamp may be solidly connected to a support structure of the front section that is rigid under normal operating conditions of the vehicle or, vice versa, the clamp may be connected to the radiator module and the projection may be connected to the support structure.

The projection may simply be held in the clamp in the form of a frictional engagement; however, the clamp is preferably deformable and the projection engages into the clamp in a form-fitting fashion such that a resistance of the clamp that is adapted to the function needs to be overcome in order to separate the projection from the clamp. The clamp is preferably elastically deformable such that it is merely required to press the projection back into the clamp in order to restore the arrangement of the radiator module.

The radiator module preferably comprises a radiator and a frame that encloses the radiator. Since the frame does not have to have any heat exchanger properties, it can essentially be constructed with consideration of its dimensional stability and strength only. The frame should protrude over a front side of the radiator that faces the bumper so as to ensure that only the frame comes in contact with the bumper and any direct contact between the bumper and the radiator that could damage the radiator is prevented when the bumper yields rearward during a low-speed collision.

This effect can be promoted by providing the frame with pins that protrude toward the bumper to both sides of the radiator.

The radiator can also be protected by providing the frame with a yoke that spans the front side of the radiator.

In order to protect the radiator, it is also practical that a rear side of the bumper that faces the radiator module has a concave contour.

BRIEF DESCRIPTION OF THE DRAWINGS

The present invention will hereinafter be described in conjunction with the following drawing figures, wherein like numerals denote like elements, and FIG. 1 shows a perspective representation of the components of a motor vehicle front section that are relevant to embodiments of the invention, namely according to a first embodiment of the invention;

FIG. 4 shows a second embodiment in the form of a representation analogous to FIG. 1.

DETAILED DESCRIPTION

Figure 2:
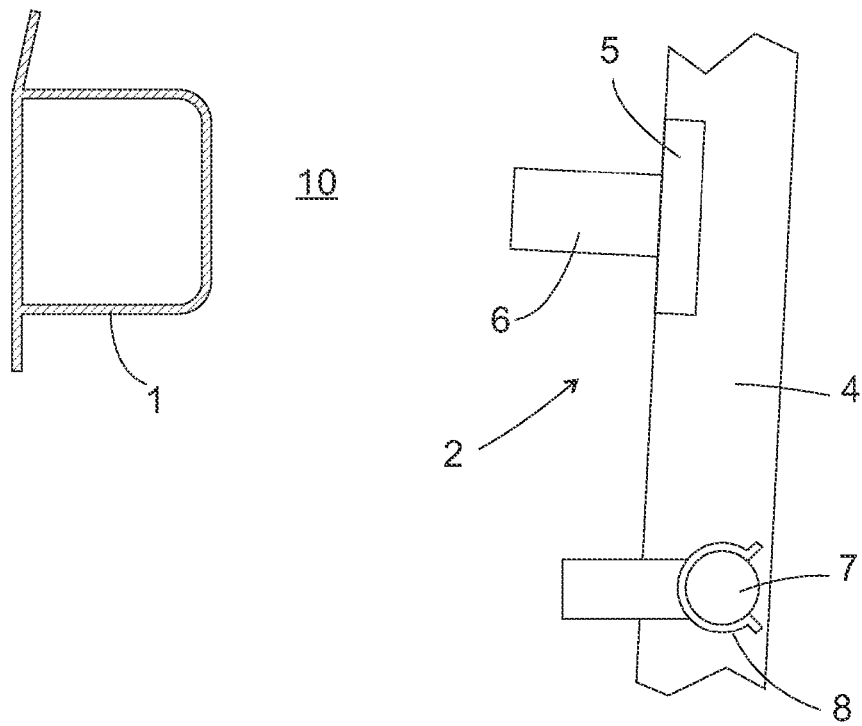
FIG. 2 shows a schematic sectional representation of the front section in the normal state.

The following detailed description is merely exemplary in nature and is not intended to limit application and uses. Furthermore, there is no intention to be bound by any theory presented in the preceding summary and background or the following detailed description.

FIG. 1 shows a perspective top view of a bumper 1 and a radiator module 2 according to an embodiment of the present invention, namely in the relative position that these components assume in an intact motor vehicle front section. The bumper is essentially realized in the form of a metallic hollow profile that is fixed on a not-shown rigid front section of the car body by means of (not-shown) support arms that can be compressed in the longitudinal direction of the vehicle, namely so-called crash boxes. The bumper 1 and the crash boxes are conventionally designed such that they deform in a plastic fashion in case of a collision. Consequently, the bumper 1 can yield rearward during a collision in the longitudinal direction of the vehicle. In an initial phase of the deformation process, the deformation is concentrated on the crash boxes and the bumper 1 such that the front section is protected from damages that require costly and labor-intensive repairs if a minor collision occurs.

The radiator module comprises a radiator 3 of conventional design that is enclosed by a frame 4 of plastic or metal that is also referred to as a fan bracket. In the illustration according to FIG. 1, the frame 4 is reduced to two profiled parts to the left side and the right side of the radiator 3; alternatively, the radiator 3 could also be enclosed by a peripheral frame.

Two pins 9 on the upper ends of the essentially vertical profiled parts of the frame 4 represent first holding means for mounting the radiator module 2 on the front section of the vehicle and engage into openings of not-shown carrier parts that are solidly connected to the front section of the vehicle. Once the pins 9 are engaged in the openings, the radiator module 2 is able to carry out a limited pivoting motion about a pivoting axis that horizontally extends through the two pins 9 in the transverse direction of the vehicle, but not a translatory motion of the radiator module 2 as a whole.

The two profiled parts of the frame 4 respectively carry a lug 5 that laterally protrudes at the height of the bumper 1. An arbor 6 protrudes from this lug toward the bumper 1. Two laterally protruding pins 7 of the frame profile are held in a form-fitting fashion in elastic clamps 8 that are solidly connected to the front section of the vehicle. They represent second holding means for mounting the radiator module 2 on the front section of the vehicle.

Naturally, the first holding means may also be realized in the form of pins on the lower ends of the profiled parts of the frame 4 or pins that laterally protrude from the profiled parts parallel to the pins 7 may define the axis of a pivoting motion of the radiator.

Figure 3:
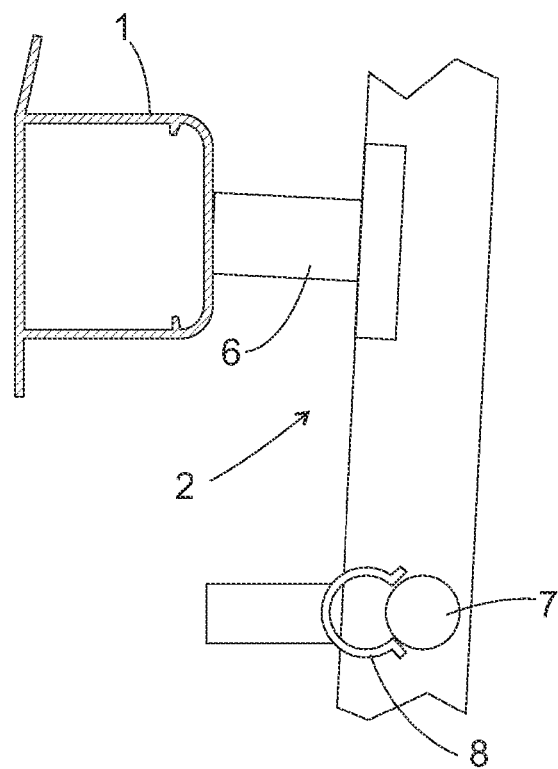
FIG. 3 shows a schematic sectional representation analogous to FIG. 2 in case of a collision.

The function of the embodiment of the invention is shown more clearly in FIG. 2, in which the bumper 1 is illustrated in the form of a sectional representation and part of a frame 4 of the radiator module 2 with its lug 5, the arbor 6 and the pin 7 is illustrated in the form of a side view. In the intact state shown, the bumper 1 is separated from the radiator module 2 by a gap 10, and the bumper 1 and the arbor 6 lie opposite of one another at the same height. When the bumper 1 is pushed rearward during a collision as shown in FIG. 3, the gap 10 is reduced and the bumper 1 impacts on the arbor 6 of at least one of the two profiled parts and thusly pushes the radiator module 2 toward the rear. During this process, the pins 7 press apart the limbs of the elastically deformable clamps 8 and are ultimately released from the clamps 8. In this state, the radiator module 2 is able to give way to the pressure of the bumper 1 without noteworthy resistance and to yield rearward as long as sufficient space is available on the rear side of the radiator module 2 as shown on the right side in FIG. 3 and FIG. 4. The radiator 3 is only damaged between the bumper 1 and an obstacle arranged on the rear side of the radiator, usually an engine block or an exhaust gas system, if the collision is so severe that this space is also used up. After minor collisions, however, it suffices to repair the damages to the crash boxes and, if applicable, the skin of the car body; the radiator module 2 can be simply snapped back into the clamps 8 and then reused.

If the radiator 3 was not damaged during the collision, it can continue to fulfill its function adequately such that the vehicle is able to reach a repair shop without assistance, namely even if the radiator was separated from the clamps 8 and pushed rearward.

It would also be conceivable, in principle, to refrain from dividing the radiator module 2 into the radiator 3 and the frame 4 and to arrange the arbors 6 or another element that comes in contact with the rearward yielding bumper directly on the radiator. However, the aforementioned division provides the advantage that damaged arbors 6 or pins 7 resulting from a collision can be quickly and inexpensively repaired by exchanging the corresponding components of the frame 4 (i.e., the radiator itself requires no repairs).

According to FIG. 1, the bumper 1 has a curved shape with a concave rear side that faces the radiator module 2. During a collision, in which the bumper 1 is about symmetrically subjected to a load that is distributed over its width, the curvature of the bumper 1 is preserved such that this curvature ensures that the bumper 1 impacts on the arbors 6 and displaces the radiator module 2 out of the clamps 8 before the bumper can actually come in contact with the radiator 3.

During a collision with a narrow obstacle such as a tree, the bumper 1 is only subjected to a load in a small section of its width and it is possible that the bumper 1 buckles. FIG. 4 shows an embodiment that also makes it possible to protect the radiator 3 in such instances. In this case, the two arbors 6 are replaced with a rib 11 that is curved forward and extends from one of the vertical profiled parts of the frame 4 to the other vertical profiled part at the height of the bumper 1. This rib 11 is able to absorb and introduce the pressure of the bumper 1 into the frame 4 if the bumper 1 situated in front of the radiator 3 buckles such that it is also possible for the radiator module 2 to yield rearward in such instances in order to prevent damages to the radiator 3.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A front section for a motor vehicle that is located between two sides of the motor vehicle, the front section comprising:
    a bumper having a rear side; and
    a radiator module arranged behind the bumper, the radiator module comprising:
        a front side disposed between a first side and a second side, wherein the front side faces the rear side of the bumper; and
        a first holder and a separable second holder adapted to hold the radiator module,
            wherein the first holder protrudes from the radiator module in an upward direction and allows a movement of the radiator module with one degree of freedom in a direction facing away from the bumper when the separable second holder is separated, wherein the separable second holder comprises: a first portion and a second portion, wherein the first portion protrudes laterally from the first side of the radiator module towards one of the sides of the motor vehicle, and wherein the second portion of separable second holder is separable from the first portion by a rearward motion of the bumper.

2. The front section according to claim 1, wherein the degree of freedom concerns a pivoting motion.

3. The front section according to claim 1, wherein the first holder defines a pivoting axis.

4. The front section according to claim 1, wherein the second portion of the separable second holder comprises a clamp that is open in a longitudinal direction of the motor vehicle and wherein the first portion of the separable second holder comprises a projection inserted into an open side of the clamp.

5. The front section according to claim 4, wherein the projection engages into the clamp in a form-fitting fashion.

6. The front section according to claim 1, wherein the radiator module and the bumper are separated by an air gap.

7. The front section according to claim 1, wherein the radiator module comprises:
   a radiator; and
   a frame that encloses the radiator,
   wherein the frame protrudes over a front side of the radiator that faces the bumper.

8. The front section according to claim 7, wherein the frame further comprises:
   projections that extend toward the bumper.

9. The front section according to claim 7, wherein the frame carries a yoke that spans a front side of the radiator.

10. The front section according to claim 1, wherein the rear side of the bumper that faces the radiator module has a concave contour.

11. The front section according to claim 1, wherein the radiator module further comprises:
    an upper side that faces in the upward direction;
    a bottom side that faces in a downward direction; and
    a rear side, opposite the front side, that faces in a rearward longitudinal direction, and
    wherein the front side faces in a frontward longitudinal direction towards the bumper,
    wherein the first and second sides of the radiator module face in opposing transverse directions that are substantially orthogonal to the rearward longitudinal direction and the frontward longitudinal direction.

12. The front section according to claim 11, wherein the upward direction and the downward direction are both substantially orthogonal to the rearward longitudinal direction and the frontward longitudinal direction.

13. The front section according to claim 11, wherein the upward direction and the downward direction are both substantially orthogonal to the opposing transverse directions.

14. The front section according to claim 11, wherein the first holder comprises:
    first and second pins that protrude from the radiator module in an upward direction and allow movement of the radiator module about a pivoting axis with one degree of freedom in the direction facing away from the bumper when the separable second holder is separated, wherein the pivoting axis extends horizontally through the first and second pins in the opposing transverse directions.

15. The front section according to claim 11, wherein the first portion of the separable second holder protrudes laterally from the first side of the radiator module in one of the opposing transverse directions towards one of the sides of the motor vehicle, and wherein the separable second holder further comprises:
    a third portion that protrudes laterally from the second side of the radiator module in the other one of the opposing transverse directions towards the other one of the sides of the motor vehicle; and
    a fourth portion that is separable from the third portion by the rearward motion of the bumper.

* * * * *